United States Patent
Dolog et al.

(10) Patent No.: US 11,905,786 B2
(45) Date of Patent: Feb. 20, 2024

(54) METHOD OF FORMING A SAND CONTROL DEVICE FROM A CURABLE INORGANIC MIXTURE INFUSED WITH DEGRADABLE MATERIAL AND METHOD OF PRODUCING FORMATION FLUIDS THROUGH A SAND CONTROL DEVICE FORMED FROM A CURABLE INORGANIC MIXTURE INFUSED WITH DEGRADABLE MATERIAL

(71) Applicants: Rostyslav Dolog, Houston, TX (US); Yash Parekh, Houston, TX (US); Juan Carlos Flores Perez, The Woodlands, TX (US); Valery N. Khabashesku, Houston, TX (US); Qusai A. Darugar, Houston, TX (US)

(72) Inventors: Rostyslav Dolog, Houston, TX (US); Yash Parekh, Houston, TX (US); Juan Carlos Flores Perez, The Woodlands, TX (US); Valery N. Khabashesku, Houston, TX (US); Qusai A. Darugar, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 598 days.

(21) Appl. No.: 16/459,709

(22) Filed: Jul. 2, 2019

(65) Prior Publication Data

US 2021/0002972 A1    Jan. 7, 2021

(51) Int. Cl.
*C04B 14/46* (2006.01)
*C04B 28/00* (2006.01)
(Continued)

(52) U.S. Cl.
CPC .......... *E21B 33/12* (2013.01); *C04B 14/4631* (2013.01); *C04B 14/4656* (2013.01);
(Continued)

(58) Field of Classification Search
CPC .......... E21B 33/12; E21B 43/04; E21B 43/08; E21B 2200/08; E21B 43/082;
(Continued)

(56) References Cited

U.S. PATENT DOCUMENTS 2,746,552 A * 5/1956 Grospas .................. E21B 43/08
166/235
6,390,195 B1 * 5/2002 Nguyen .................. E21B 43/08
166/287

(Continued)

FOREIGN PATENT DOCUMENTS

| CA | 2797700 A1 | 11/2011 | |
| CN | 107806335 A * | 3/2018 | ............. E21B 43/08 |
| EP | 1331357 A1 | 7/2003 | |

OTHER PUBLICATIONS

Geopolymer Institute [retrieved from the internet, May 3, 2022 <URL: https://www.geopolymer.org/science/introduction/>] (Year: 2012).*

(Continued)

*Primary Examiner* — Anthony J Green
*Assistant Examiner* — Marites A Guino-O Uzzle
(74) *Attorney, Agent, or Firm* — CANTOR COLBURN LLP

(57) ABSTRACT

A method of forming a sand control device comprising: infusing a curable inorganic mixture with a degradable material configured to disintegrate upon exposure to an external stimuli; forming the curable inorganic mixture
(Continued)

infused with the degradable material about a tubular; and curing the curable inorganic mixture infused with the degradable material.

8 Claims, 3 Drawing Sheets

(51) Int. Cl.
   *E21B 33/12* (2006.01)
   *E21B 43/04* (2006.01)
   *E21B 43/08* (2006.01)
   *C04B 111/00* (2006.01)

(52) U.S. Cl.
   CPC ............ *C04B 28/006* (2013.01); *E21B 43/04* (2013.01); *E21B 43/08* (2013.01); *C04B 2111/00663* (2013.01); *E21B 2200/08* (2020.05); *Y02P 40/10* (2015.11)

(58) Field of Classification Search
   CPC ............... E21B 43/086; E21B 2200/00; C04B 14/4631; C04B 14/4656; C04B 28/006; C04B 2111/00663; C04B 14/46; C04B 28/00; C04B 2111/00706; C04B 2111/00474; C04B 2111/00; Y02P 40/10
   See application file for complete search history.

(56) References Cited

U.S. PATENT DOCUMENTS

| | | | | |
|---|---|---|---|---|
| 7,172,022 | B2 | 2/2007 | Reddy et al. | |
| 8,783,349 | B2 | 7/2014 | Robisson et al. | |
| 2004/0251033 | A1* | 12/2004 | Cameron | E21B 43/105 166/207 |
| 2004/0261993 | A1* | 12/2004 | Nguyen | C04B 28/02 106/729 |
| 2005/0056425 | A1 | 3/2005 | Grigsby et al. | |
| 2005/0205258 | A1* | 9/2005 | Reddy | C04B 28/02 166/295 |
| 2009/0260817 | A1* | 10/2009 | Gambier | E21B 33/1275 166/305.1 |
| 2011/0086942 | A1* | 4/2011 | Robisson | E21B 33/1208 523/130 |
| 2012/0175134 | A1* | 7/2012 | Robisson | E21B 33/1208 166/135 |
| 2013/0292117 | A1* | 11/2013 | Robisson | E21B 43/08 166/227 |
| 2016/0258242 | A1* | 9/2016 | Hayter | E21B 34/06 |

OTHER PUBLICATIONS

N.M. Azmee, N. Shafiq, Ultra-high performance concrete: From fundamental to applications, Case Studies in Construction Materials, v.9, 2018, e00197, DOI: 10.1016/j.cscm.2018.e00197 <URL: https://www.sciencedirect.com/science/article/pii/S2214509518301360> (Year: 2018).*

CN-107806335-A, machine translation (Year: 2018).*

Risdanareni, Puput & Puspitasari, Poppy & Santoso, Edi & Adi, Edo. (2017). Mechanical and physical properties of metakaolin based geopolymer paste. MATEC Web of Conferences. 101. 01021. 10.1051/matecconf/201710101021. (Year: 2017).*

Rodriguez, Juan. How to cure concrete with water and plastic membranes (2019) [retrieved from the internet on Mar. 22, 2023 from < URL: https://www.liveabout.com/highly-recommended-methods-to-cure-concrete-844449>]. (Year: 2019).*

International Search Report and Written Opinion for International Application No. PCT/US2020/040227; International Filing Date Jun. 30, 2020; dated Oct. 13, 2020 (pp. 1-10).

Pyo, et al. "Abrasion resistance of ultra high performance concrete incorporating coarser aggregate" Construction and Building Materials 165 (2018) 11-16.

Nergis, et al. "Geopolymers and Their Uses: Review" IOP Conf. Ser. Mater. Sci. Eng. . . vol. 374. 2018. (pp. 1-11).

Salinas, et al.; "Controlled Electrolytic Metallics—An Interventionless Nanostructured Platform," Proceeding of SPE International Oilfield Nanotechnology Conference and Exhibition, Noordwijk, The Netherlands, Jun. 12-14, 2012, SPE 153428; 5 pages.

* cited by examiner

METHOD OF FORMING A SAND CONTROL DEVICE FROM A CURABLE INORGANIC MIXTURE INFUSED WITH DEGRADABLE MATERIAL AND METHOD OF PRODUCING FORMATION FLUIDS THROUGH A SAND CONTROL DEVICE FORMED FROM A CURABLE INORGANIC MIXTURE INFUSED WITH DEGRADABLE MATERIAL

BACKGROUND

In the resource recovery industry boreholes are created in a formation for the purpose of extracting formation fluids. For production, a completion is run into the borehole and set in place. Typically, the completion includes a tubular that supports a number of packers. The packers, when deployed, separate the wellbore into various production zones. A screen assembly extends around the tubular in each production zone. Production fluids pass through the screen assembly into the tubular and flow to a surface of the formation. Particles entrained in the production fluids are excluded from the tubular by the screen assembly.

Over time, sand and other particles entrained in the production fluids erode portions of the screen assembly. Particles may clog screen openings and may create hot spots that eventually lead to breaches in the screen assembly. The breaches allow the particles to flow to the surface with the production fluids. When too many particles are found in the production fluids, it may become desirable to replace the screen assembly or take other remedial steps to exclude the particles. Replacing the screen assembly and the other remedial steps create production delays that increase production costs. As such, the industry would welcome systems for making more robust screen assembles that are more capable of withstanding erosion forces.

SUMMARY

Disclosed is a method of forming a sand control device includes infusing a curable inorganic mixture with a degradable material configured to disintegrate upon exposure to an external stimuli, forming the curable inorganic mixture infused with the degradable material about a tubular, and curing the curable inorganic mixture infused with the degradable material.

Also disclosed is a method of excluding particles entrained in formation fluids including introducing a tubular into a wellbore, forming a sand control device formed from a curable inorganic mixture infused with a degradable material about the tubular, introducing an external stimulus onto the sand control device causing the degradable material to dissolve, and flowing formation fluids through the sand control device into the tubular.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
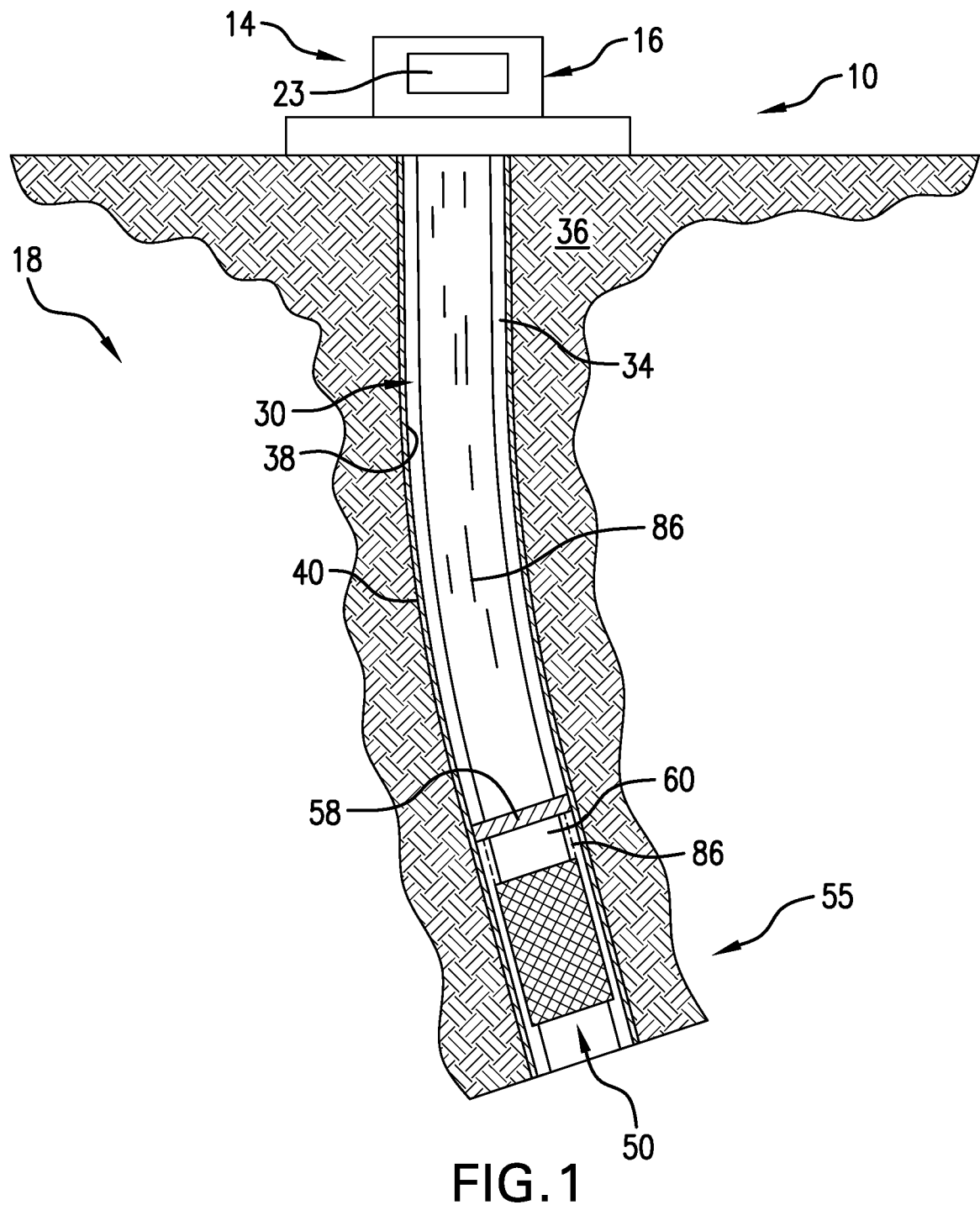
FIG. 1 depicts a resource exploration and recovery system including a sand control device formed from a curable inorganic mixture infused with degradable material, in accordance with an exemplary embodiment.

A resource exploration and recovery system, in accordance with an exemplary embodiment, is indicated generally at 10, in FIG. 1. Resource exploration and recovery system 10 should be understood to include well drilling operations, completions, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a subsurface system.

First system 14 may include a control system 23 that may provide power to, monitor, communicate with, and/or activate one or more downhole operations as will be discussed herein. Surface system 16 may include additional systems such as pumps, fluid storage systems, cranes and the like (not shown). Second system 18 may include a tubular string 30 that extends into a wellbore 34 formed in a formation 36. Wellbore 34 includes an annular wall 38 defined by a casing tubular 40. Tubular string 30 may be formed by a series of interconnected discrete tubulars. A sand control device 50 is mounted to tubular string 30.

Figure 2:
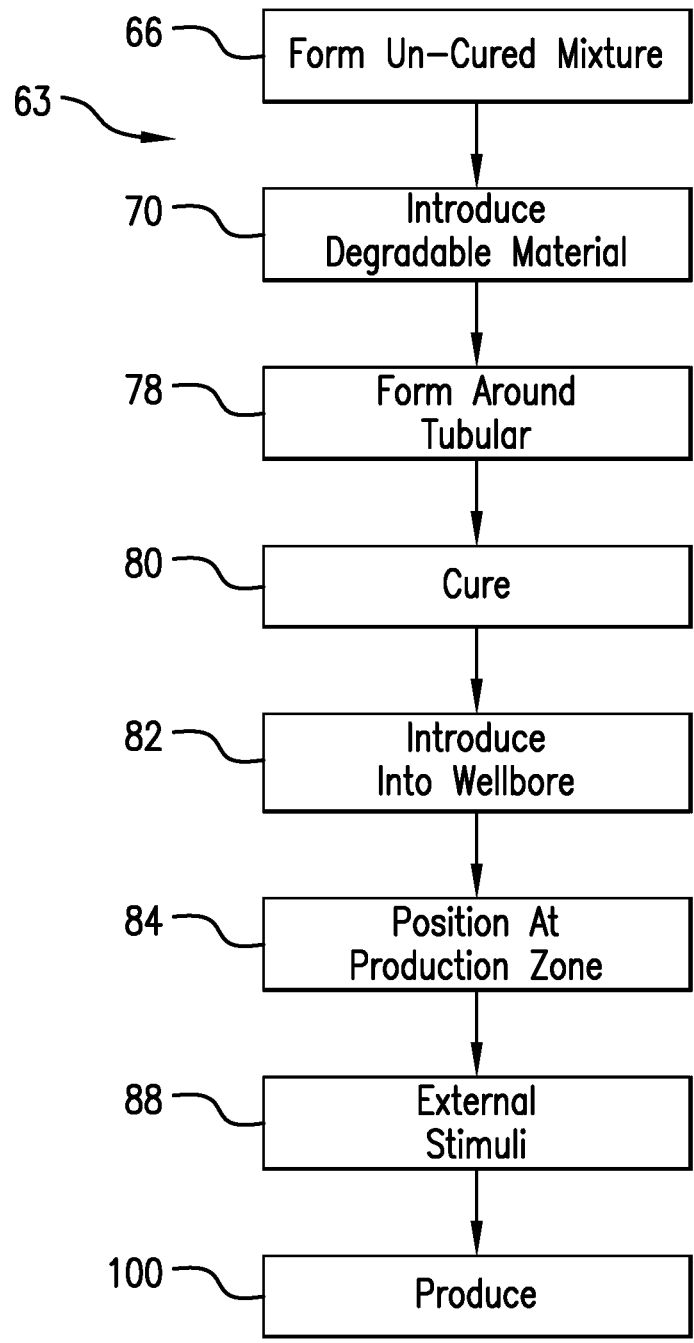
FIG. 2 depicts a flow chart showing a method of forming and deploying a sand control device formed from the curable inorganic mixture infused with degradable material in accordance with an aspect of an exemplary embodiment.

In accordance with an exemplary embodiment, sand control device 50 is arranged in a production zone 55 that is defined as an area downhole of a packer 58 on a tubular 60 that forms part of tubular string 30. Production zone 55 may be defined between packer 58 and another packer (not shown) or between packer 58 and a toe (not shown) of wellbore 34. As will be detailed herein, sand control device is formed of a curable inorganic mixture 68 including at least one of a cementitious material and a geopolymer material formed by a method 63 shown in FIG. 2.

Cementitious material may take the form of one or more of High Performance Concrete (HPC), Ultra-High Performance Concrete (UHPC), fiber-reinforced concrete (FRC), and High-Performance Fiber-reinforced concrete (HPFRC). The term "geopolymer material" should be understood to describe an inorganic amorphous network of covalently bonded silico-oxide (—Si—O—Si—O—), silico-aluminate (—Si—O—Al—O—), ferro-silico-aluminate (—Fe—O—Si—O—Al—O—) and/or alumino-phosphate (—Al—O—P—O—). As indicated in block 66, curable inorganic mixture 68 may be formed into a paste. In block 70, degradable material 72 is added to the paste of curable inorganic mixture 68. Degradable material 72 may take the form of one or more of a controlled electrolytic metallic (CEM) material such as In-Tallic®, pH-sensitive polymers; ion-sensitive polymers; inorganic salts, and organic salts.

In an embodiment, pH-sensitive polymers may include cationic polymers with amino acid groups having a higher solubility at acidic pH than at a neutral pH or Anionic polymers with carboxyl, sulfonyl, or phosphoryl groups having a higher water solubility at basic pH than at acid pH. pH-sensitive polymers may also include imidazole groups or poly (β-amino ester) which are responsive to low pH. Inorganic salts may include pH sensitive polymers that allow for precise control over removal of degradable material 72 creating pores in sand control device 50 as will be detailed herein.

Figure 3:
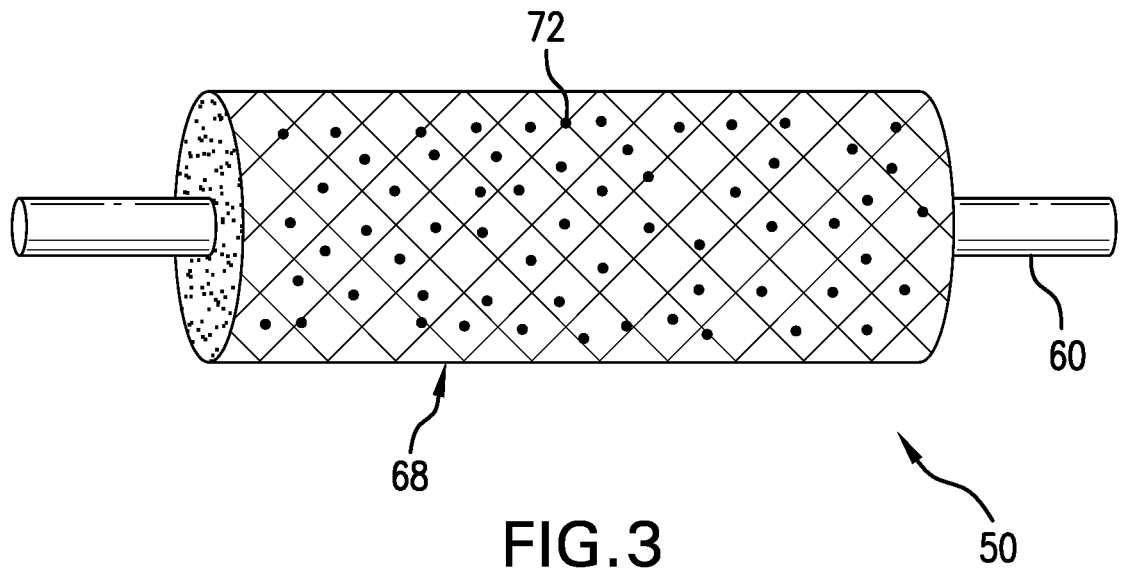
FIG. 3 depicts the sand control device prior to activation of the degradable material, in accordance with an aspect of an exemplary embodiment.

In an embodiment, the paste of curable inorganic mixture 68 infused with degradable material 72 is formed about tubular 60 in block 78 as shown in FIG. 3. In block 80, the paste of curable inorganic mixture 68 infused with degradable material 72 is cured or hardened. In an embodiment, curing may include an application of heat or curing may take place in an absence of heat to form sand control device 50. Heat may be employed to accelerate curing. Curing may also include exposure to air, or other substances. At this point, sand control device 50 does not include cavities or openings that will allow passage of fluids.

In accordance with an exemplary aspect, sand control device 50 may be introduced into wellbore 34 as indicated in block 82 and positioned in production zone 55 as indicated in block 84. At this point, an external stimulus or activation fluid 86 (FIG. 1) such as a fluid having a selected pH value is introduced into wellbore 34. The choice of activation fluid may vary and would depend on the particular type of degradable material 72 infused into the paste of curable inorganic mixture 68.

Figure 4:
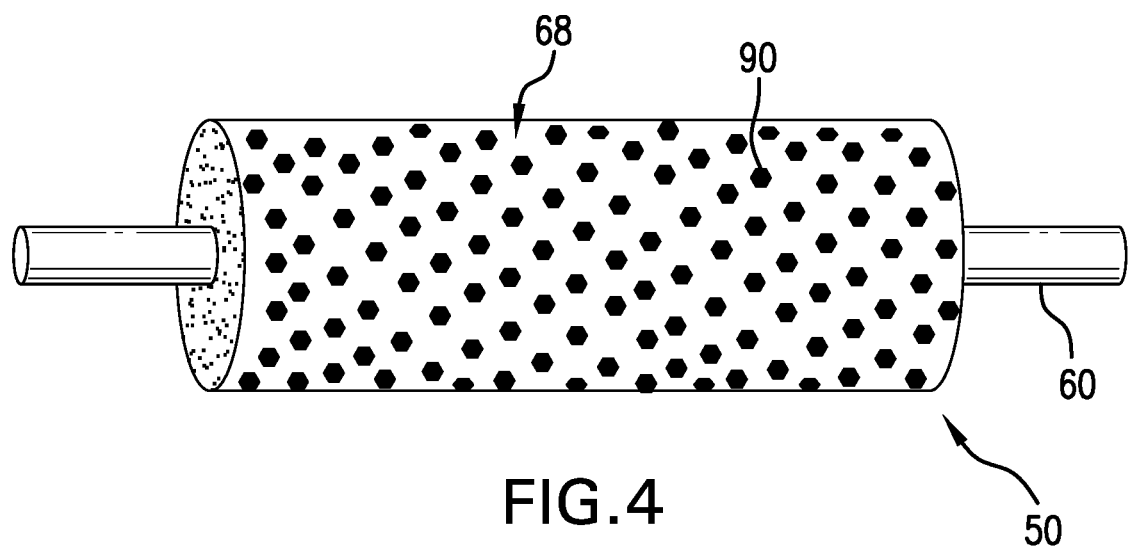
FIG. 4 depicts the sand control device after activation of the degradable material, in accordance with an aspect of an exemplary embodiment.

External stimulus 86 may be introduced into tubular string, flowed around packer 58 and into contact with sand control device 50 as indicated in block 88. External stimulus 86 triggers a dissolution of degradable material 72 causing cavities or pores 90 such as shown in FIG. 4 to open. The creation of cavities 90 allows production fluid to pass through sand control device 50 into tubular string 30 as indicated in block 100. In an alternate embodiment, sand control device 50 may be exposed to external stimulus 86 prior to being introduced into wellbore 34.

In another exemplary embodiment, curable inorganic mixture 68 infused with degradable material 72 may be introduced into wellbore 36 and flowed about tubular string 30. A packer or other device may be deployed at a set depth to prevent curable inorganic mixture 68 infused with degradable material 72 from passing beyond a certain point. Once curable inorganic mixture 68 infused with degradable material 72 fills an annulus between tubular string 30 and annular wall 38, curing may take place. Curing may be a result of exposure to heat from formation 36. Once cured, external stimulus or activation fluid 86 may be introduced to degrade the degradable material so as to form a permeable sand screen.

At this point, it should be understood that the sand control device, constructed in accordance with exemplary embodiments described herein, possesses high abrasion resistance and erosion resistance that may withstand prolonged exposure to sand particles. Further, it should be understood that the degradable material may be tailor to allow greater control over multiple sand control devices. That is, different degradable materials may be used that are responsive to different external stimulus or activation fluids so as to provide greater control over sand control device activation. Finally, it should be understood that the degradable material may be shaped and provided in an amount that promotes pore interconnectivity.

Set forth below are some embodiments of the foregoing disclosure:

Embodiment 1

A method of forming a sand control device comprising: infusing a curable inorganic mixture with a degradable material configured to disintegrate upon exposure to an external stimuli; forming the curable inorganic mixture infused with the degradable material about a tubular; and curing the curable inorganic mixture infused with the degradable material.

Embodiment 2

The method according to any prior embodiment, wherein forming the curable inorganic mixture infused with degradable material about the tubular includes forming a paste formed from one of High Performance Concrete (HPC), Ultra-High Performance Concrete (UHPC), fiber-reinforced concrete (FRC), and High-Performance Fiber-reinforced concrete (HPFRC) about the tubular.

Embodiment 3

The method according to any prior embodiment, wherein forming the curable inorganic mixture infused with degradable material about the tubular includes forming a paste formed from a geopolymer about the tubular.

Embodiment 4

The method according to any prior embodiment, wherein forming the paste from geopolymer includes forming a paste from an inorganic amorphous network of covalently bonded elements including at least one of silico-oxide (—Si—O—Si—O—), silico-aluminate (—Si—O—Al—O—), ferro-silico-aluminate (—Fe—O—Si—O—Al—O—) and alumino-phosphate (—Al—O—P—O—).

Embodiment 5

The method according to any prior embodiment, wherein the degradable material includes at least one of a controlled electrolytic metallic (CEM) material, pH-sensitive polymers, ion-sensitive polymers, inorganic salts, and organic salts.

Embodiment 6

The method according to any prior embodiment, wherein curing includes heating the curable inorganic mixture infused with the degradable material.

Embodiment 7

The method according to any prior embodiment, wherein forming includes positioning the curable inorganic mixture infused with the degradable material about a perforated portion of the tubular.

Embodiment 8

A method of excluding particles entrained in formation fluids comprising: introducing a tubular into a wellbore; forming a sand control device formed from a curable inorganic mixture infused with a degradable material about the tubular; introducing an external stimulus onto the sand control device causing the degradable material to dissolve; and flowing formation fluids through the sand control device into the tubular.

Embodiment 9

The method according to any prior embodiment, wherein introducing the external stimulus into the wellbore includes guiding a liquid having a selected pH value into the tubular.

Embodiment 10

The method according to any prior embodiment, wherein introducing the external stimulus into the wellbore includes guiding a liquid having a selected pH value into the wellbore about the tubular.

Embodiment 11

The method according to any prior embodiment, wherein introducing the external stimulus into the wellbore includes guiding a liquid having a selected pH value into the wellbore about the tubular and into the tubular.

Embodiment 12

The method according to any prior embodiment, wherein introducing the external stimulus includes exposing the sand control device to a liquid having a selected pH outside of the wellbore.

Embodiment 13

The method according to any prior embodiment, wherein flowing the formation fluids into the tubular includes passing the formation fluids through openings formally occupied by the degradable material.

Embodiment 14

The method according to any prior embodiment, wherein forming the sand control device includes flowing the curable inorganic mixture infused with a degradable material into the wellbore about the tubular.

Embodiment 15

The method according to any prior embodiment, wherein forming the sand control device includes forming the sand control device about the tubular outside of the wellbore.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of forming a sand control device prior to introduction downhole comprising:
    infusing a curable inorganic cementitious mixture with a degradable material configured to disintegrate upon exposure to an external stimuli;
    creating a screen member by forming the curable inorganic cementitious mixture infused with the degradable material about a tubular; and
    curing the curable inorganic cementitious mixture infused with the degradable material on the tubular, wherein the degradable material selectively degrades to form openings in the screen member.

2. The method of claim 1, wherein forming the curable inorganic cementitious mixture infused with degradable material about the tubular includes forming a paste formed from one of High Performance Concrete (HPC), Ultra-High Performance Concrete (UHPC), fiber-reinforced concrete (FRC), and High-Performance Fiber-reinforced concrete (HPFRC) about the tubular.

3. The method of claim 1, wherein forming the curable inorganic cementitious mixture infused with degradable material about the tubular includes forming a paste formed from a geopolymer about the tubular.

4. The method of claim 3, wherein forming the paste from geopolymer includes forming a paste from an inorganic amorphous network of covalently bonded elements including at least one of silico-oxide (—Si—O—Si—O—), silico-aluminate (—Si—O—Al—O—), ferro-silico-aluminate (—Fe—O—Si—O—Al—O—) and alumino-phosphate (—Al—O—P—O—).

5. The method of claim 1, wherein curing includes heating the curable inorganic cementitious mixture infused with the degradable material.

6. The method of claim 1, wherein forming includes positioning the curable inorganic cementitious mixture infused with the degradable material about a perforated portion of the tubular.

7. The method of claim 1, wherein the degradable material comprises an degradable metallic material.

8. The method of claim 7, wherein the degradable metallic material comprises a controlled electrolytic metallic (CEM) material.

\* \* \* \* \*